United States Patent

Luboshez

[15] 3,684,352

[45] Aug. 15, 1972

[54] RADIOCHROMIC COMBINED ABSORBING REFLECTING AND TRANSMITTING STRUCTURE

[72] Inventor: Sergius N. Ferris Luboshez, 3530 Pinetree Terrace, Falls Church, Va. 22041

[22] Filed: Jan. 11, 1971

[21] Appl. No.: 105,366

[52] U.S. Cl. ..............................350/160 P, 350/263

[51] Int. Cl. ..............................G02f 1/36, G02b 27/00

[58] Field of Search ..........350/160 P, 264, 265, 263

[56] References Cited

UNITED STATES PATENTS

| | | | |
|---|---|---|---|
| 3,443,860 | 5/1969 | Luboshez | 350/264 |
| 3,409,247 | 11/1968 | Pezdirtz | 350/160 P |
| 3,406,085 | 10/1968 | Brown et al. | 350/160 P |

*Primary Examiner*—Ronald L. Wibert
*Assistant Examiner*—V. P. McGraw
*Attorney*—John Harrow Leonard

[57] ABSTRACT

The shade is a combined heat reflecting, light transmitting, absorbing, and thermal insulating shade which is contoured in a regular repetitive geometric pattern such that one face of the shade can be exposed to the sun, in a manner to position certain areas so that they become show areas which receive direct solar radiations, and to position contiguous areas relative to the show areas so that they become underlay areas which are shaded by the adjacent show areas and receive only indirect solar radiations.

The shade is normally transparent photo-chromic material which, when subjected to direct solar radiation, changes color and loses its transparency to a degree depending upon the intensity of the direct radiation, and which, under high intensity direct sunlight, becomes substantially opaque.

14 Claims, 12 Drawing Figures

INVENTOR.
S. N. F. Luboshez,
BY
John H Leonard,
his ATTORNEY.

INVENTOR.
S. N. F. Lubosky
By
John H. Leonard
his ATTORNEY.

RADIOCHROMIC COMBINED ABSORBING REFLECTING AND TRANSMITTING STRUCTURE

This invention relates to a shade which, by reflecting and cutting off, and in some instances also absorbing, the direct rays emanating from a radiant source while transmitting the indirect rays therefrom, discriminates between direct radiation and diffused indirect radiation emanating from a source.

Heretofore, as more fully disclosed in my U.S. Letters Pat. No. 3,443,860, issued May 13, 1969, entitled Pleated Shade for Controlling Heat and Light, a sheet of clear plastic is pleated in regular parallel pleats of the same size and shape. Certain show areas of the pleats which will be positioned to be exposed to the direct rays of the sun are coated with heat reflecting material, such, for example, as metallic paints, or with other pigment, and contiguous underlay areas of the pleats which will be positioned so as to be exposed only to the indirect rays and diffused sunlight are left uncoated so that indirect reflected and diffused light can pass readily therethrough.

The pleats generally are arranged so that when the pleats are expanded from flat condition, and one face of the shade is exposed to the sun, the coated areas are subjected to the direct rays and reflect them, and the underlay areas are shaded by the show areas from the direct rays and receive only the indirect diffused light. The coating is such that in a more expanded condition of the pleated shade, one side of each pleat provides the show area and has a heat reflecting coating, and the other side of each pleat thereby provides the underlay area, and is shaded from direct rays of the sun by the first mentioned side, and is left clear and uncoated so that indirect light can enter.

In some instances, only part of the show area of each pleat is coated so that, at a certain degree of expansion of the pleats by tensioning the shade edgewise transversely of the pleats, a limited amount of direct sunlight can pass through the show area to the corresponding parallel side of the next adjacent pleat.

Such shades have very distinct and advantageous lighting effects and heat insulating effects. They exclude the direct rays of the sun in summer when the sunlight is intense and the sun is high above the horizon during the heat of the day, while admitting the diffused or reflected light. As the sun lowers in the evening or winter months, they can admit some of the direct rays along with the diffused light.

Since these prior shades are heat reflecting and insulating when juxtaposed against the window pane, they prevent undue heating of the room in summer yet permit a substantial amount of solar heating in winter, and also prevent loss of heat from the room in winter.

In this type of shade, some compromises had to be made in the extent of the coating applied to the various show areas. To some extent an adjustment was permitted by expanding the pleats to different degrees and by positioning the shade so that the length of the pleats extend vertically or at an angle to the horizontal instead of horizontally. However, a setting for one season, one time of day, or one cloud condition was not necessarily the optimum for a different season, time of day, or cloud condition.

In accordance with the present invention, the sheet is formed into a repetitive geometric pattern, as disclosed in the above-identified patent, so as to have show areas which receive the direct rays from a source of radiation and underlay areas which receive only the indirect rays. The material incorporated in the sheet, or applied as a coating thereon, is radiochromic; that is, it changes color when exposed to direct radiations from the particular source and thus reflects, cuts off, or absorbs the direct rays, but passes the indirect reflected rays. The specific composition chosen for the sheet or coating depends upon the type of source of radiation. The material may be one which changes color or darkens and becomes more opaque when exposed to the direct intense rays of sunlight. Specifically, such radiochromic material is photochromic. If used for heat rays, the material may be one that changes color or darkens due to exposure to direct heat rays. Such radiochromic material is specifically thermochromic. Other radiochromic materials which darken in such fashion when exposed either to intense light rays, or heat rays, or combinations thereof, are known as "thermophotochromic."

A preferred embodiment of the invention for use in connection with shading and insulating relative to solar radiations is disclosed herein for purposes of illustration, and is illustrated in the drawings, in which.

Figure 2:
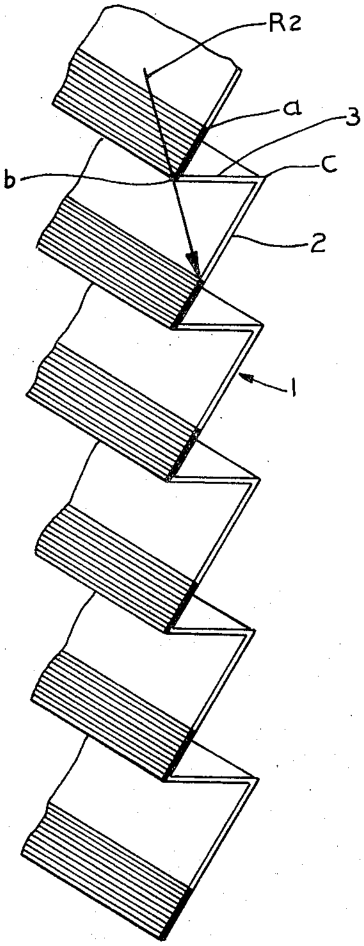
FIG. 2 is an enlarged perspective view of the shade of FIG. 1 in one expanded condition and illustrating the effects produced when the shade is subjected to solar rays approaching at a steep angle to the horizontal.
Figure 1:
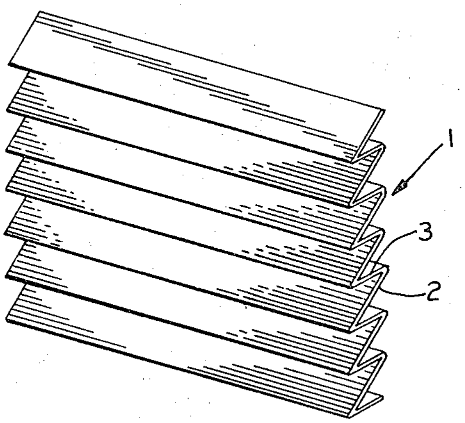
FIG. 1 is a perspective view of a shade embodying the principles of the present invention.

Referring to FIGS. 1 and 2, the shade is contoured, as mentioned, in a regular repetitive geometric pattern such that, when one face of the sheet is exposed to the sun, certain surface areas thereof receive the direct solar rays. These areas are positioned so that they are between the sun and other contiguous areas.

The regular repetitive geometric pattern preferred is one such as illustrated in the drawings wherein a sheet, indicated generally at 1, is pleated with a succession of parallel pleats of like size and shape, so that each pleat has one side 2, referred to as the show side or show area, arranged so that when the shade is hung in an upright position, such side lies in a plane which is exposed toward the direct solar rays. Each pleat has another side 3, referred to as the underlay side, is arranged so that the side 2 is between it and the sun, the direct rays strike all or part of the side 2 and are prevented thereby from striking the side 3.

In most positions of the sun and expanded conditions of the pleats, the side 3 lies completely in the shadow of the side 2.

The sheet 1 is broadly of a radiochromic material which, in the form described for use in connection with solar rays, is more specifically photochromic.

Figure 3:
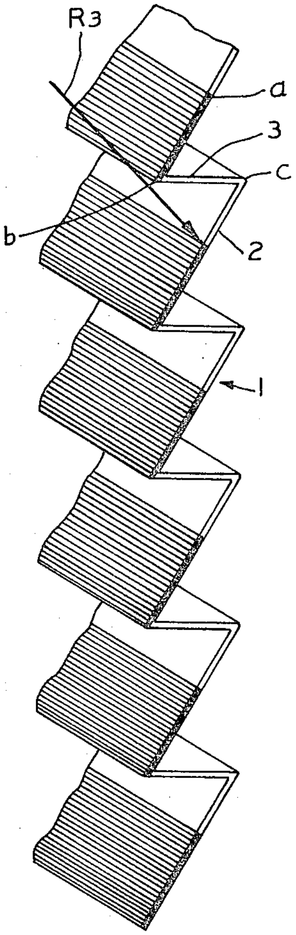
FIG. 3 is a view corresponding to FIG. 2, except that it illustrates the effects produced when the shade is subjected to solar rays approaching at a less steep angle to the horizontal.

When the shade in normal expanded condition is exposed to the sun with the sun at a very high angle, as illustrated in FIG. 3, each side 3 is shaded in its entirety by the adjacent side 2 immediately thereabove. Also, a large portion of each side 2 may be shaded by the adjacent side 2 immediately thereabove.

In any event, the portion of each side 2 exposed to the direct rays of the sun becomes darker, due to the photochromic character of the material. The degree of darkness intensifies with the intensity of the direct rays, and becomes substantially opaque under the usual or more intense rays.

In FIG. 2, the show areas are the areas of the sides 2 between the lines *a* and *b*, which are darkened by shade lining to indicate the change to darker color or opacity. The underlay areas, in the shadow of the show areas, are all of the sides 3, which lie between lines *b* and *c*, and those parts of the sides 2 which lie between lines *c* and *a*.

The accumulative effect of these ray darkened areas is such that, beginning one pleat below the topmost pleat, all of the sides 3 and substantial portions of the sides 2 are shaded by the darkened show areas and remain clear so that the diffused and indirect reflected sunlight can pass therethrough. If, as in FIG. 3, the direct sun rays, indicated by the arrow $R_3$ are at a flatter angle, a greater area of each side 2 is subjected to the direct ray and darkens. Thus as the rays progressively approach the horizontal, were control predicated solely on the expansion or shape of the pleats, a larger area would be exposed so that more direct rays would pass through the shade. However, with photochromic material, the larger area thus exposed to direct rays becomes darker or opaque and reduces or cuts off these additional rays.

Figure 4:
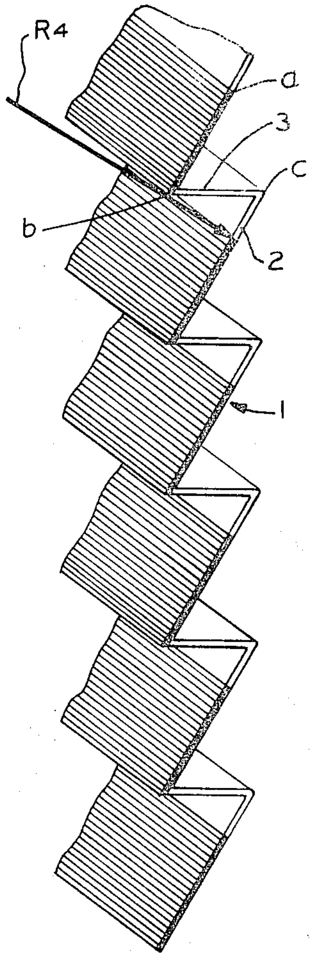
FIG. 4 is a view corresponding to FIG. 2, except that it shows the effect produced when the shade is exposed to solar rays at a relative flat angle to the horizontal.

When the rays become almost horizontal, as illustrated in FIG. 4, then almost all of each side 2 darkens.

The parts which are in the shadows of the darkened portions of the side 2 retain their normal light transmitting effect and thus transmit the indirect light from the sun.

An attractive view of the outside from within the room is afforded by the clear or underlay areas. The darkened show areas, thereby, operate in effect as a number of miniporches, which keep out direct sunlight while admitting indirect outside reflected light, but which, contrary to conventional porches, adjust themselves automatically to varying sun and shade conditions which normally occur during the day and seasons of the year.

Figures 5, 6, 7, 8, 9, 10:
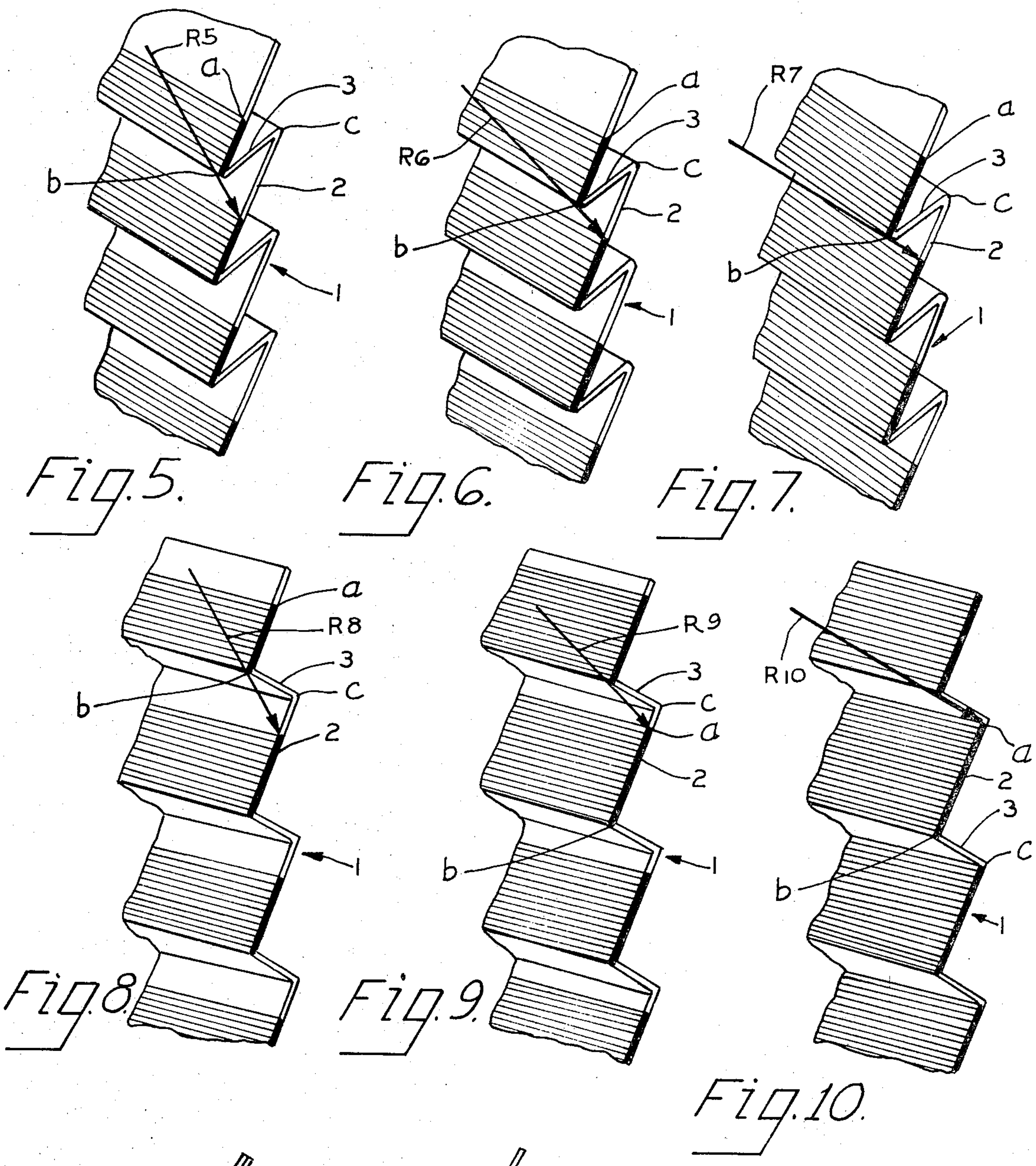
FIGS. 5 through 10 are diagrammatic illustrations of the shade illustrating the effects produced by the sun at different angles to the horizontal with the shade at different degrees of expansion.

Referring next to FIGS. 5 through 10, FIG. 5 illustrates the shade in a less expanded condition than in FIGS. 1–4, so that the sides 2 and 3 are at angles more acute than in FIGS. 1–4, with the sun rays $R_5$ at 60° to the horizontal. FIG. 6 illustrates the shade in the less expanded condition of FIG. 5 with the sun rays $R_6$ at 45° to the horizontal. FIG. 7 illustrates the shade of FIGS. 5 and 6 with the sun rays $R_7$ at 30° to the horizontal. In all of these Figures, the extent of the darkened areas is indicated by shade lines. Also it is to be noted that as the angle of the rays to the horizontal increases, the area exposed thereto decreases.

In FIGS. 8, 9, and 10, the shade is shown in a more expanded condition than in FIGS. 1–4, with the sun rays at different angles. In FIG. 8, the rays $R_8$ are 60° to the horizontal. In FIG. 9, the rays $R_9$ are at 45°, and in FIG. 10, the rays $R_{10}$ are at 30° to the horizontal. Here again, the resulting darkened areas are indicated by shade lines.

Figure 11:
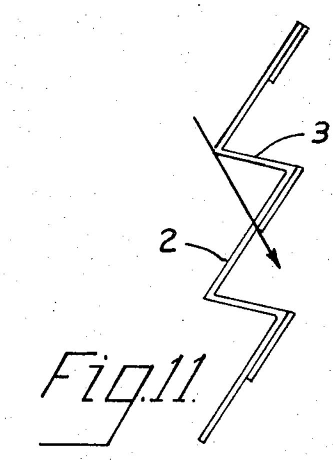
FIG. 11 is a diagrammatic fragmentary cross sectional view of a shade combining metallic coating with the shade of FIG. 1.
Figure 12:
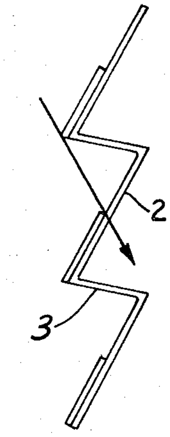
FIG. 12 is a diagrammatic fragmentary cross sectional view of a shade similar to FIG. 11 with a different disposition of the metallic coating thereon.

As illustrated in FIGS. 11 and 12, part of each side 2 may be coated with opaque material, such as heat absorbing or heat reflecting pigment, a reflective metal pigment coating being preferred. Such coatings are used in the manner and for the purposes described in the above identified patent. Generally, the coating is applied to that portion of each side 2 nearest to the side 3 of the pleat immediately thereabove. Combinations of metal coating and photochromic, or radiochromic, material render the shade suitable for a wide variety of special uses, dictated by the nature of the radiation and need for insulation, as well as decorative uses dictated by the desires of the user.

Other types of pleats, as described in the above patent, and still other repetitive geometric patterns may be employed if they are capable of providing show areas and contiguous underlay areas for functioning in the relation heretofore described. The important feature is that the shade is composed of radiochromic, and specifically photochromic material, either alone or in combination with coating material.

The shade may be fastened directly to the window or in frames adjacent the window, or on rolls so that it can be rolled up and down. Furthermore, provision can be made for expanding it more or less depending upon the desired effect desired by the householder. Ordinarily with the radiochromic screen no adjustment is necessary as the show areas receive direct rays and, by darkening automatically, adjust themselves to shade the underlay areas to be shaded so as to pass indirect rays through the latter in a desirable relation to the direction and intensity of the direct solar rays as the solar angle varies with the seasons and with the time of day.

The quantity and characteristics of radiochromic substance embodied in or upon the basic material will vary in accordance with the effect desired. Thus, the thickness of the basic sheet embodying such radiochromic material can be varied to provide the desired effect. While the basic sheet material may be flexible and resilient, it may also be rigid, for example, made of glass or suitable plastic.

For the purpose of exemplification only, as mentioned, this invention has been described hereinbefore with reference to the sun as a source of radiation and a window opening of a building as the location of the device. The structure has important applications to diverse situations involving other sources of radiation. An application of this invention is for aircraft windows. Direct radiation from the sun at high altitudes of the airplane, as it strikes the occupants, causes great discomfort. This invention cuts off such direct rays and by virtue of its structure is efficient in permitting visibility outwards and particularly downwards towards the earth, which is the main direction in which occupants of an aircraft look. At the same time glare from the sun is reduced. The structure of the article provides for great stiffness combined with lightness, both important factors in the construction of aircraft.

This invention further provides devices for eye-protection against intense luminous and thermal energy emanating from a source, which may be intermittent and movable, without elimination of normal vision. It prevents visual incapacitation from intense sources of radiation. Sources of intense radiation lasting over a short period of time, as in nuclear detonations, result in the darkening photochromic effect persisting for an undesirably long period of time after the radiation ceases. The present invention ameliorates this condition by shading certain areas of the device and permitting normal vision, thus avoiding a prolonged reversal effect.

The invention is also useful as a shielding for aircraft in flight, both as to solar radiations and as to radiations from nuclear detonations. For example, the pilot's observation window may be made up of alternately arranged sections such that one section has its show areas exposed generally rearwardly of the craft and the other section has its show areas exposed generally forwardly of the craft. Thus, in flying into the sun, the first section would become totally dark show areas and dark underlay areas, whereas the second section would have dark show areas only, leaving a clear vision in the underlay areas. In flying directly away from the sun, the first section would have clear underlay areas and the second section would have dark show areas and dark underlay areas.

For radiations from nuclear detonations above the plane, the same arrangement would be used. If the detonation be below, the lower side of the pilot's observation windows would be made with alternate sections arranged as described. Thus, in either case, his eyes would be protected against visual incapacitation of, or danger to, the retina, no matter what the direction of the detonation from the aircraft might be, yet he would be assured of clear areas permitting uninterrupted observation.

The device may be activated directly by the source of radiation acting upon the photochromic material, or it may be triggered indirectly by known means. Certain photochromic compounds change color with ordinary environmental change, particularly change in illumination. Such photochromic compounds can be used to provide an automatically changing camouflage. Thus, some compounds change from yellow to orange to red and the changes caused by sunlight to cause shading may take place in seconds or less. Reversal occurs as illumination is decreased. In the present invention, the photochromic compounds can be coated upon or embodied in the basic material of the device, or both. The product can be used to provide an automatically changing camouflage while at the same time permitting light to pass through the screen and permitting visibility outwards for purposes of observation.

Having thus described my invention, I claim:

1. A radiant energy shade comprising:

a sheet of material contoured in a regular repetitive geometric pattern to provide predetermined show areas and predetermined underlay areas such that, when one face of the sheet is exposed in a predetermined position relative to a predetermined source of radiations, the show areas of that face receive the direct rays emitted from the source; and said show areas are positioned to lie in ray intercepting position between the source and said underlay areas of said face contiguous to the show areas, respectively;

characterized in that said show areas are radiochromic so that they normally admit indirect reflected and diffused rays from the source, but darken upon exposure to direct rays from the source, and thereby the show areas exposed to the direct rays shade said contiguous underlay areas from the direct rays to different degrees depending upon the radiochromic response of the show areas.

2. A shade according to claim 1 wherein the show areas normally are relatively clear and photochromic so as to darken when exposed to direct solar radiation, but to remain clear when subjected only to indirect and reflected diffused solar light.

3. A shade according to claim 2 wherein limited portions of the show areas are coated additionally with opaque material.

4. A shade according to claim 1 wherein the repetitive geometric pattern is provided by a succession of parallel pleats of the sheet.

5. A shade according to claim 1 wherein the sheet is of resiliently flexible material.

6. A shade according to claim 1 wherein the sheet is of rigid material.

7. A shade according to claim 1 wherein the radiochromic material is one which is responsive to intense luminous energy emanating from said source.

8. A shade according to claim 1 wherein the radiochromic material is one which is responsive to intense thermal energy emanating from said source.

9. A shade according to claim 1 wherein the entire sheet of material is radiochromic.

10. A radiant energy shade comprising:

a body contoured to provide a group of separate and distinct show surface areas and a group of separate and distinct underlay areas, the group of show areas being arranged relative to the body so that the body can be positioned to expose the group of show areas concurrently directly to radiations from a predetermined source, and further being arranged relative to the group of underlay areas so that, when the body is so positioned, the group of show areas lie between the source and the group of underlay areas;

characterized in that the areas of at least one of said groups are radiochromic.

11. A shade according to claim 10 characterized in that the show areas are the radiochromic areas.

12. A shade according to claim 10 characterized in that both the show areas and underlay areas are radiochromic.

13. A shade according to claim 10 characterized in that the body is radiochromic material of generally uniform thickness.

14. A shade according to claim 13 characterized in that the body is a thin sheet of photochromic material which normally transmits diffused sunlight, but darkens when subjected to direct rays of the sun.

* * * * *